(12) United States Patent
Enriquez

(10) Patent No.: US 6,829,353 B1
(45) Date of Patent: Dec. 7, 2004

(54) MECHANISM FOR PREVENTING CLIPPING OF PULSE METERING SIGNALS IN TELEPHONE LINE CARD CHANNELS

(75) Inventor: Leonel Ernesto Enriquez, Melbourne Beach, FL (US)

(73) Assignee: Intersil Corporation, Palm Bay, FL (US)

( * ) Notice: Subject to any disclaimer, the term of this patent is extended or adjusted under 35 U.S.C. 154(b) by 587 days.

(21) Appl. No.: 09/686,504

(22) Filed: Oct. 11, 2000

(51) Int. Cl.[7] .......................... H04M 1/00; H04M 9/00; H04M 9/08
(52) U.S. Cl. ...................... 379/413; 379/398; 379/416; 330/255; 330/256
(58) Field of Search ................................ 330/15.1, 255, 330/257, 100; 379/382, 398, 413, 416

(56) References Cited

U.S. PATENT DOCUMENTS

| | | | |
|---|---|---|---|
| 4,091,333 A | 5/1978 | Thrap | 330/100 |
| 4,558,287 A | 12/1985 | Tanaka | 330/257 |
| 5,210,506 A | 5/1993 | Koch et al. | 330/255 |
| 5,357,210 A | 10/1994 | Miljanic et al. | 330/15.1 |
| 5,671,272 A | 9/1997 | Cotreau | 379/382 |
| 5,929,623 A | 7/1999 | Hoshino | 330/257 |
| 6,154,094 A | 11/2000 | Seven | 330/257 |
| 6,181,792 B1 * | 1/2001 | Derby et al. | 379/398 |

* cited by examiner

Primary Examiner—Curtis Kuntz
Assistant Examiner—Alexander Jamal
(74) Attorney, Agent, or Firm—Allen, Dyer, Doppelt Milbrath & Gilchrist, P.A.

(57) ABSTRACT

A circuit arrangement prevents clipping of pulse metering (teletax) signals in a telephone line card channel that results from the differential impedance between a subscriber line interface circuit (SLIC) and the line at the frequency band of teletax signals. The circuit arrangement is configured to sense pulse metering signals through a delay circuit, which is coupled to a reflected signal cancellation circuit. The reflected signal cancellation circuit contains a transconductance amplifier circuit that generates a pair of complementary polarity output currents representative of the sensed teletax signal. One of these output currents is fed back to a programmed impedance element in the transmission channel path of the SLIC so as to effectively cancel the reflected teletax signal.

15 Claims, 2 Drawing Sheets

MECHANISM FOR PREVENTING CLIPPING OF PULSE METERING SIGNALS IN TELEPHONE LINE CARD CHANNELS

CROSS REFERENCE TO RELATED APPLICATIONS

The present invention relates to subject matter disclosed in my U.S. patent application, Ser. No. 09/639,408, entitled: "Transconductance Amplifier Circuit," filed Aug. 14, 2000 (hereinafter referred to as the '408 application), and my U.S. patent application, Ser. No. 09/686,505 entitled: "Precision, Low-Power Current-Sense Transmission Channel for Subscriber Line Interface Circuit, Programmable with Single Ended Impedances and Capable of Exhibiting a Voltage Sense Response," filed coincident herewith, (hereinafter referred to as the '505 application), both applications being assigned to the assignee of the present application, and the disclosures of which are incorporated herein.

FIELD OF THE INVENTION

The present invention relates in general to communication systems and components therefor, and is particularly directed to a new and improved mechanism for preventing clipping of pulse metering (teletax) signals in a telephone line card channel that results from the differential impedance between a subscriber line interface circuit (SLIC) and the line at the frequency band of teletax signals. The invention mitigates against or effectively eliminates clipping by tracking the pulse metering signals applied to the SLIC stage by means of a teletax signal cancellation circuit. The teletax signal cancellation circuit contains a transconductance amplifier circuit of the type described in the above-referenced '408 application, and generates a signal current that is fed back to the transmission channel path of the SLIC in a manner that effectively cancels the reflected teletax signal flowing through a programmed impedance element installed in the transmission channel.

BACKGROUND OF THE INVENTION

As described in the above-referenced '408 and '* * * applications, the transmission channels of subscriber line interface circuits, or SLICs, employed by telecommunication service providers to interface a communication wireline pair with subscriber (voice—data) communication equipment, must conform with a very demanding set of performance requirements. These requirements typically encompass accuracy, linearity, insensitivity to common mode signals, low power consumption, low noise, filtering, and ease of impedance matching programmability, in order to facilitate interfacing the SLIC with a variety of telecommunication circuits including those providing digital codec functionality.

In a typical application, the length of the wireline pair to which a SLIC is connected can be expected to vary from installation to installation, and may have a very significant length (e.g., on the order of multiple miles), transporting both substantial DC voltages, as well as AC signals (e.g., voice and/or ringing). As a consequence, it has been difficult to realize a SLIC implementation that has 'universal' use in both legacy and state of the art installations.

Advantageously, the SLIC transmission channel described in the above-referenced '505 application successfully satisfies these requirements by a new and improved combination of a front end, current-sensing, voltage-feed transimpedance stage that is coupled in cascade with a transconductance amplifier-configured filter/gain output stage. The current-sensing, voltage-feed transimpedance stage transforms differentially sensed tip and ring input currents of a telecommunication wireline pair into a precise, single ended output voltage. This single ended output voltage is transformed by the transconductance amplifier-based filter/gain output stage into a very precise, single ended output current, and converted into a single ended output voltage for application to downstream voltage-fed circuitry. In addition, the transmission channel is configured to have the output impedance it presents to the line programmable by means of a single programming pin.

Irrespective of the type of SLIC that may be installed in various telephone line cards of a telecommunication service provider's equipment facility, it is a relatively common practice worldwide, and the subject of ongoing demand to regulatory agencies by service providers in the United States, to tariff (or tax) any customer access (including 'local' calls) to a service provider's equipment on a time of usage basis. For this purpose, it has been conventional practice to employ a frequency-diversity technique known as pulse metering, or 'teletax', in which out-of-band, pulse-burst signals (typically in a range of 12 to 16 KHz) are superimposed on the in-band voice channel signals (on the order of up to 3 to 4 KHz) that are interfaced by the line circuit.

Although the basic signal transport and separation functionality of teletax signalling has worked reasonably well in the past, it can introduce significant impairments to the throughput and operation of more recently developed line cards that are configured to conform with an increasingly stringent set of parameters, particularly relatively constrained operating positive power supply voltages (on the order of three volts or less and declining).

The fundamental problem is the difference in output impedance the SLIC presents to the line for the two ranges of signals (in-band voice at 3–4 KHz and pulse metering at 12–14 KHz). In order to comply with the basic requirement of optimizing voice frequency transmissions, the SLIC is customarily configured to synthesize the output impedance $Zo$ it presents to (the tip and ring terminals of) the telephone line, such that $Zo$ equals the 'characteristic impedance' $ZL$ of the line. While this impedance may vary among different countries, a value of $Zo=600$ ohms is relatively common.

With successful synthesis of the SLIC's output impedance to match that of the line (i.e., $Zo=ZL$), the open loop differential voice signal $Vtr$ appearing across the line's tip (T) and ring (R) leads will be attenuated by a factor of two. Namely, $$Vtr = Vsignal_{o1} * ZL/(ZL+Zo) = Vsignal_{o1}/2. \qquad (1)$$

However, at the higher teletax frequencies, the impedance in the line decreases considerably; a typical value of line impedance $ZL$ at 12–14 KHz may be on the order of only 200 ohms. Substituting this value of line impedance in equation (1) results in a doubling of the attenuation factor of $Vtr$ from one-half to one-fourth.

Because of this increased attenuation, the amplitude of the pulse-metering signals are normally increased (e.g., doubled) to ensure proper levels of reception at the receiving end of the circuit. These larger amplitude signals are reflected back to the impedance synthesis loop of the SLIC, whose transmission port is connected to a coding channel in an associated codec, which is companion to the SLIC in the line card. As codecs are usually very low voltage devices, they are incapable of handling large amplitude signals. As a consequence, the reflected teletax signals can lead to distortion in the codec due to clipping.

SUMMARY OF THE INVENTION

In accordance with the present invention, such clipping and distortion associated with the differential impedance between the SLIC and the line at the frequency band of teletax signals is effectively eliminated by tracking the pulse metering signals applied to the teletax port of a SLIC stage, using a teletax signal cancellation circuit that incorporates a transconductance amplifier circuit of the type described in the above-referenced '408 application. The teletax signal, which is sensed by this cancellation circuit through a resistor—capacitor delay circuit, is used to generate a signal current that is fed back to the transmission channel path of the SLIC stage in a manner that effectively cancels the reflected teletax signal flowing through a programmed impedance element.

As will be described, the configuration of the transconductance amplifier circuit and current mirror ratios of current mirror circuitry it employs are such as to provide a prescribed attenuation Attx that is effective to provide for cancellation of teletax signal current. In particular, the parameters of the cancellation circuit are defined such that for teletax frequency band signals, the synthesized output impedance Zo of the SLIC has a value of zero and thereby eliminates the presence of pulse-metering signals at the input of a codec, so as to preclude clipping. In order to quantify the resistors and the capacitor of the delay circuit at values that provide complete cancellation of the reflected teletax signal, the peak amplitude of the differential line voltage is made equal to the voice/data overload voltage.

DETAILED DESCRIPTION

Figure 1:
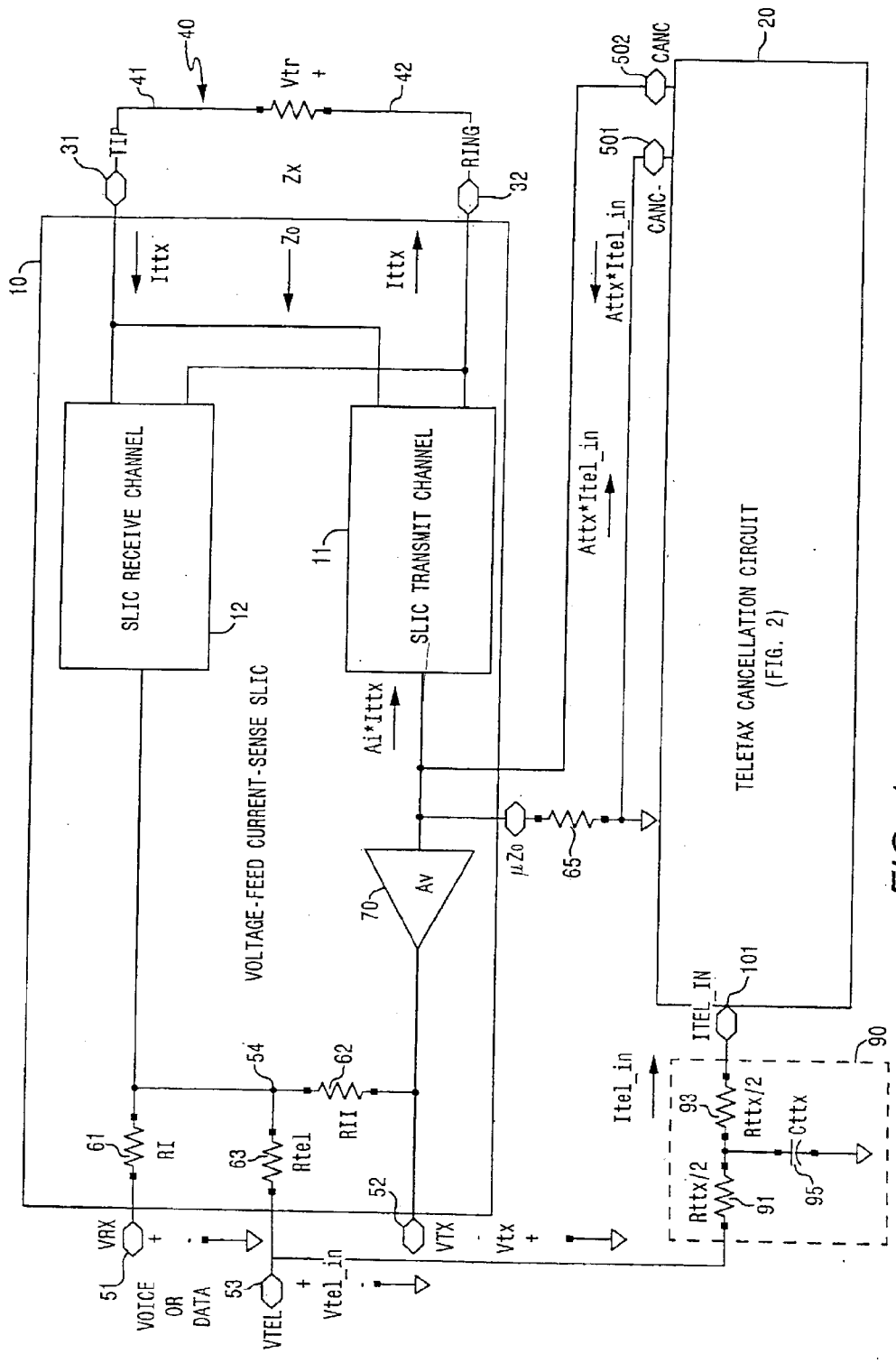
FIG. 1 diagrammatically illustrates a subscriber line interface circuit architecture that incorporates the pulse metering clipping preventing mechanism of the present invention.

The overall configuration of a subscriber line interface circuit (SLIC) architecture that incorporates the pulse metering clipping prevention mechanism of the present invention is diagrammatically illustrated in FIG. 1, as comprising a SLIC stage 10 coupled with a pulse metering signal (teletax) cancellation circuit or stage 20. Pursuant to a non-limiting, but preferred embodiment, the SLIC stage 10 may be configured as a current-sense, voltage-feed circuit as described and shown in the above-referenced '505 application, while the pulse metering cancellation stage 20 may include a transconductance amplifier circuit of the type disclosed in the above-referenced '408 application, and shown in FIG. 2, to be described.

In order to simplify the illustration of the pulse-meter signal-canceling SLIC architecture of FIG. 1, the SLIC stage 10 has been shown as comprising a transmit channel 11 and a receive channel 12, line-coupling sides of which are respectively ported to tip and ring terminals 31 and 32, which are coupled, in turn, to tip and ring leads 41 and 42 of a telecommunication wireline pair 40 (shown as having a line impedance Zx at teletax frequencies). The circuit-coupling side of the SLIC receive channel 12 is coupled to a (voice/data) receive (Vrx) port 51 and a (voice/data) transmit (Vtx) port 52 through a receive channel resistor 61 (having a value RI) and a transmit channel resistor 62 (having a value RII), respectively. The circuit-coupling side of the SLIC transmit channel 11 is coupled to an operational amplifier 70, the output of which is coupled to the transmit (Vtx) port 52. Pulse metering signals Vtel are coupled to the SLIC by way of a teletax port 53, and summed with the voice/data signals coupled with port 51 by means of a resistor 63 having a value Rtel and coupled between port 53 and the common node 54 of receive and transmit channel resistors 61 and 62, respectively.

With the impedance of the wireline pair 40 having a (relatively reduced) value of Zx at the (higher) frequency of transmission of pulse-metering signals, and the SLIC having a synthesized impedance equal to the characteristic line impedance Zo, the teletax voltage signals appearing between the tip and ring terminals 31 and 32 will be proportional to the ratio $Zx/(Zx+Zo)$. For purposes of illustration and quantification, the pulse-metering signals across the wireline pair, namely, across the impedance Zx, may have a peak amplitude equal to the overload level Vovl desired for in-band voice or data signals (which is typically on the order of three volts) Effectively canceling reflected pulse metering signals in the impedance within the impedance synthesis path of the SLIC would achieve a value of zero for the output impedance Zo, and eliminate the presence of pulse-metering signals at the input of the codec, so as to prevent any possibility of clipping.

For pulse-metering signals Vtel_in coupled to teletax port 53 and having a voltage gain value of Atel, the differential line voltage Vtr may be defined in equation (2) as:

$$Vtr=Vtel\_in*Atel*Zx/(Zx+Zo) \quad (2).$$

Therefore, the reflected teletax voltage reflected at transmit port 52 may be defined in equation (3) as:

$$Vtx=Vtel\_in*Atel*AI*Av*MZo/(Zo+Zx) \quad (3),$$

where AI is a loop current attenuation factor, MZo is the value of a programmed impedance element 65 coupled to the input of operational amplifier 70 and programmed with a value M times larger than the characteristic impedance Zo of the line, and Av is the closed loop voltage gain of the operational amplifier 70.

From equation (2) it can be seen that the relatively large amplitudes are required from the product Vtel_in*Atel, if the desired amplitude for the differential wireline voltage Vtr is to equal the voice/data overload level Vovl, referenced above.

For proper voice/data impedance synthesis, it is customary to establish the boundary condition set forth in equation (4):

$$AI*M*Av*2RI/RII=1. \quad (4).$$

Substituting equations (2) and (4) in equation (3) and letting Vtr=Vovl yields equation (5):

$$Vtx=Vovl*Zo/Zx*RII/2RI \quad (5).$$

In order to reduce the above-described clipping problem, without excessively compromising the transmission quality of voice/data signals, it is common practice in applications requiring pulse-metering to equalize the values RI/RII of resistors 61/62. Even under this condition (RI=RII) and for the typical values of Zo and Zx referenced above, equation (5) results in a value of Vtr (on the order of 1.5 Vovl) that exceeds Vovl, and therefore exceeds the codec's (and likely the SLIC's) signal-range handling capability, particularly when considering the simultaneous transmission requirement for voice/data signals and teletax signals on the same wireline pair.

To effectively compensate for this excessive Vtr signal amplitude, the teletax cancellation stage 20 is configured to sense the teletax input signal Vtel_in applied to port 53 and generate a signal current that is fed back to the transmission channel path of the SLIC stage 10, in a manner that effectively cancels the reflected teletax signal flowing through the programmed impedance element 65. For this purpose, the teletax port 53 is coupled through a "T"-configured, resistor—capacitor delay circuit 90 having first and second series-coupled resistors 91 and 93, each with a value of Rttx/2, to an input port 101 of teletax cancellation stage 20. The delay circuit 90 further includes a capacitor 95, having a value Cttx, referenced to ground and coupled to the common node of resistors 91 and 93. In order to quantify resistors 91, 93 and capacitor 95 to values that provide complete cancellation of the reflected teletax signal, the peak amplitude of the differential line voltage Vtr is made equal to the overload level Vovl.

The resulting loop current Ittx flowing through the line (impedance Zx) is defined in equation (6) as:

$$Ittx = Vtr/Zx = Vovl/Zx = Atel*Vtel\_in/Zx \qquad (6).$$

In equation (6), at pulse-metering frequencies, for complete cancellation of the reflected teletax signal, the SLIC output impedance Zo equals 0, as described above.

In order for the current flowing through the programmed impedance element 65 to equal zero, the following relationship in equation (7) must hold:

$$Attx*Itel\_in = AI*Ittx = Ai*Atel*Vtel\_in/Zx \qquad ,(7)$$

where Itel_in is the current flowing from the teletax port 53 through the delay circuit 90 to the input port 101 of the pulse metering cancellation stage 20, and Attx defines the effective attenuation provided by current mirror circuitry of the transconductance amplifier of the pulse metering cancellation stage 20.

Figure 2:
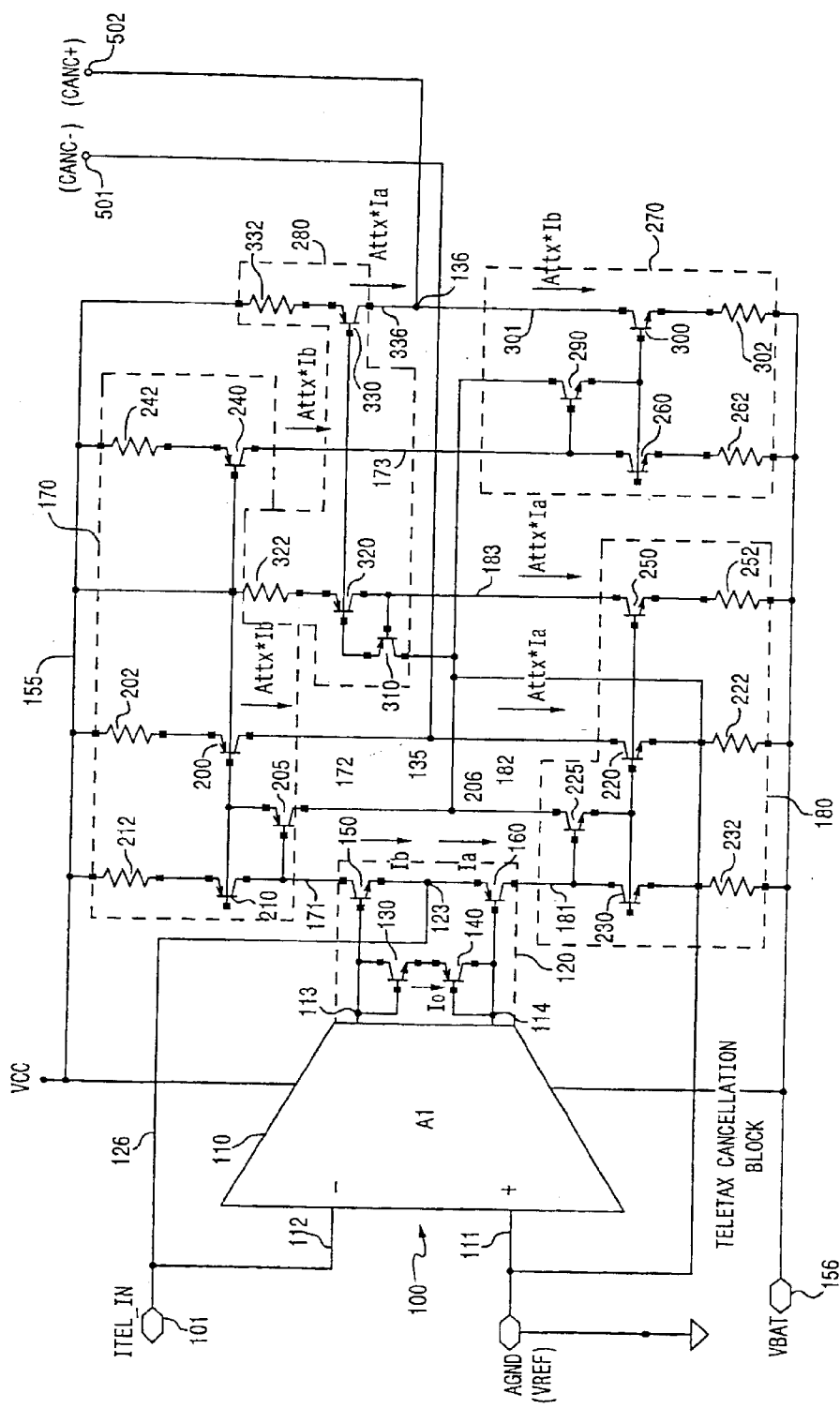
FIG. 2 shows the circuit configuration of the transconductance amplifier of the pulse metering signal cancellation stage of the circuit of FIG. 1.

The pulse metering cancellation stage 20 of the SLIC architecture of FIG. 1 is shown in detail in FIG. 2 as comprising a transconductance amplifier-based circuit of the type disclosed in the '408 application. Although the circuit architecture of FIG. 2 is shown as bipolar transistor-based, it is to be understood that this circuit may be implemented using alternative equivalent components, such as field effect transistors (FETs), for example.

The transconductance amplifier circuit is shown at 100 as including an operational amplifier configured as a unity gain buffer, including a dual polarity input operational amplifier input and gain stage 110, and a low output impedance, output stage 120. The amplifier's input stage 110 may have a conventional high impedance, moderate voltage gain circuit configuration, and is shown as being connected as a ground potential follower (A1). The input stage 110 has a first, non-inverting polarity input 111, that is adapted to be coupled to a DC reference voltage (Vref), such as ground (GND), and a second, inverting polarity input 112, which is coupled to track the teletax current Itel-in through the series coupled resistors 91 and 93 of the delay circuit 90, as described above.

The amplifier's output stage 120 has a differentially coupled transistor circuit pair, that includes a first, diode-connected NPN transistor 130, whose collector and base are connected in common to a first polarity output port 113 of amplifier input stage 110. The emitter of NPN transistor 130 is coupled in common to the emitter of a second, diode-connected PNP transistor 140. In a complementary fashion, PNP transistor 140 has its collector and base connected in common to a second polarity output port 114 of the amplifier input stage 110. The base of NPN transistor 130 is coupled in common with the base of an NPN transistor 150, the emitter of which is coupled in common to the emitter of a PNP transistor 160 and to an input/output node 123 of the amplifier's output stage 120.

The PNP transistor 160 has its base coupled in common with the base of the PNP transistor 140. The output stage's input/output node 123 is coupled over a negative feedback path 126 to the inverting input 112 of the amplifier's input stage 110. Unlike a conventional amplifier circuit, the input/output node 123, rather than being employed to supply an output current to a downstream load, is coupled to receive the teletax input current Itel_in supplied through series-coupled resistors 91–93 from the teletax input port 53.

The series-connected, collector-emitter current paths through the output transistors 150 and 160 of the transconductance amplifier's output stage 120, rather than being biased via a direct coupling to respective (Vcc and Vee/VBAT) voltage supply terminals 155 and 156, are coupled in circuit with first current supply paths 171 and 181 of first and second current mirror circuits 170 and 180, respectively. These current mirror circuits level shift the biasing of the amplifier's output stage 120, so that the output current produced at a first output port 135 can be accurately generated independently of the output voltage.

For this purpose, the current mirror circuit 170 includes a first PNP transistor 200 having its emitter coupled through a resistor 202 to the (Vcc) voltage supply rail 155, and its base coupled in common with the emitter of a current mirror PNP transistor 205, and with the base of a current mirror PNP transistor 210, whose emitter is coupled through a resistor 212 to the (Vcc) voltage supply rail 155. The base of current mirror transistor 205 is coupled to the collector of current mirror transistor 210.

The current mirror transistor 200 supplies a mirrored output current to the current supply path 172 as a prescribed factor K of the current received by transistor 210 over the current supply path 171, in accordance with the ratio (1:(K= Attx) of the geometries of the transistors 210/200 and the values of the resistors 202/212. The collector of transistor 210 is coupled over the first current supply path 171 of the current mirror 170 to the collector of the transistor 150 of the output stage 120. The collector of transistor 200 is coupled over a second current supply path 172 of the current mirror 170 to output port 135. The collector of transistor 205 is coupled to a node 206 which is coupled to grounded input terminal 111 of input stage 110.

In a complementary manner, the second current mirror circuit 180 includes a first NPN transistor 220 having its emitter coupled through a resistor 222 to the (VBAt) voltage supply rail 156 and its base coupled in common with the emitter of an NPN current mirror transistor 225 and the base of a current mirror NPN transistor 230, whose emitter is coupled through resistor 232 to (VBAT) voltage supply rail 156. The collector of the current mirror transistor 230 is coupled over the first current supply path 181 of the current mirror 180 to the collector of output stage transistor 160. The collector of transistor 225 is coupled to grounded node 206.

The collector of transistor 220 is coupled over a second current supply path 182 of the current mirror 180 to the first output port 135. The current mirror transistor 220 provides a mirrored output current to current supply path 182 as a factor K=Attx of the current received by transistor 230 over current supply path 181, in accordance with the (1:(K=Attx) ratio of the geometries of transistors 230/220 and the values of resistors 222/232.

As described in the '408 application, current node equations that define the transfer function of the transconductance amplifier circuit of FIG. 2 reveal that this circuit architecture has a very wide dynamic range (at very low quiescent power dissipation) that accommodates multiple, differential polarity voltages applied through resistors at its current feed port 112.

More particularly, the single ended output current $i_{123}$ delivered to input/output node 123 may be defined in equation (8) as:

$$i_{123}=(Vtel\_in-V_{111})Z_{in}, \quad (8)$$

wherein $Z_{in}$ corresponds to the input impedance (here through delay circuit 90) through which the input voltage Vtel_in is applied to the port 101 coupled in common with input/output node 123.

The currents $i_{171}$ and $i_{181}$ supplied to current mirrors 170 and 180 may be related to the current $i_{123}$ at the input/output node 123 by equation (9) as:

$$i_{123}+i_{171}=i_{181} ==> i_{123}=i_{181}-i_{171} \quad (9)$$

The currents $i_{172}$ and $i_{182}$ supplied by current mirrors 170 and 180 may be related to the current $i_{135}$ at the first output node 135 by equation (10):

$$i_{172}+i_{135}=i_{182} \quad (10)$$

and equation (11) as:

$$Ki_{171}+i_{135}=Ki_{181} => i_{out}=i_{135}=Ki_{181}-i_{171})=Ki_{123} \quad (11)$$

Substituting equation (8) into equation (11) yields equation (12) as:

$$i_{out}=i_{123}=(Vtel\_in-V_{111})Z_{in} \quad (12)$$

Implicit in equations (9) and (11) is the fact that transistor limitations due to beta and early voltage are compensated or minimized (in a manner not specifically shown in FIG. 2). It may also be noted that if transistors 130/150 and 140/160 are matched pairs and the time average value of the input voltage applied to the input terminal 112 is a DC voltage, the time average values of currents $i_{171}$ and $i_{181}$ are equal to the DC bias current $I_{DC}$ flowing in the emitter path of the output stage transistors 130–140.

The transconductance amplifier circuit of FIG. 2 further includes a pair of auxiliary current mirror circuits 270 and 280, that are cross-coupled with the current mirror circuits 170 and 180. The current node relationships associated with this cross-coupling of the auxiliary current mirror circuits 270 and 280 with current mirror circuits 170 and 180 are such that the auxiliary current mirror circuits 270 and 280 supply to an additional output port 136 the same precision output current (but in an opposite directional sense) that is provided at output port 135. These two (opposite polarity) current output ports 135 and 136 are coupled to respective complementary phase teletax cancellation terminals 501 (CANC−) and 502 (CANC+).

For this purpose, the current mirror circuit 170 is augmented to include an additional PNP transistor 240 having its emitter coupled through a resistor 242 to the Vcc voltage supply rail 155, and its base coupled in common with the bases of PNP transistor 200 and 210. Transistor 240 has its collector coupled over a third, cross-coupling current supply path 173 of the current mirror circuit 170 to the collector of an NPN current mirror transistor 260 and the base of an NPN current mirror transistor 290 within the auxiliary current mirror circuit 270. The NPN current mirror transistor 260 has its emitter coupled through a resistor 262 to the VBAT voltage supply rail 156, and its base coupled in common with the base of an NPN transistor 300, whose emitter is coupled through a resistor 302 to the VBAT voltage supply rail 156. The emitter of transistor 290 is coupled to the bases of transistors 260 and 300, and its collector is coupled to grounded node 206. Transistor 300 supplies an output current over an output current supply path 301 to output port 136, as a prescribed K' multiple of the current supplied over the third current supply path 173 in accordance with the ratio (1:K'=Attx) of the geometries of transistors 300/260 and resistors 302/262.

In a complementary fashion, the current mirror circuit 180 is augmented to include an additional NPN transistor 250 having its emitter coupled through a resistor 252 to the VBAT voltage supply rail 156, and its base coupled in common with the bases of NPN transistor 220 and 230. Transistor 250 has its collector coupled over a third, cross-coupling current supply path 183 of the current mirror circuit 180 to the base of a PNP current mirror transistor 310 and collector of a PNP current mirror transistor 320 within auxiliary current mirror circuit 280. The emitter of PNP transistor 310 is coupled to the base of PNP transistor 320, and the collector of transistor 310 is coupled to grounded node 206.

The PNP current mirror transistor 320 has its emitter coupled through a resistor 322 to the Vcc voltage supply rail 155, and its base coupled in common with the base of a PNP transistor 330, whose emitter is coupled through a resistor 332 to Vcc voltage supply rail 155. Transistor 330 supplies an output current over an output current supply path 336 to output port 136, as a prescribed K' multiple of the current supplied over the third current supply path 183 in accordance with the ratio (1:K'=Attx) of the geometries of the transistors 330/320 and resistors 332/322.

The equations that define the transfer function associated with auxiliary current mirrors 270 and 280 show that the additional single ended output node 136 produces an output current that is equal and in opposite direction to the current produced at output node 135. In particular, due to the current mirror action of transistors 260 and 300 of current mirror circuit 270, the current ATTx*Ib supplied by the collector of transistor 300 in auxiliary current mirror circuit 270 is equal to some factor K' times the third current $i_{173}$ supplied by the collector of the transistor 240 in current mirror circuit 170. Likewise, the current Attx*Ia supplied by the collector of transistor 330 in the auxiliary current mirror circuit 280 is some factor K' times the value of the fourth output current $i_{183}$ supplied by at the collector of transistor 250 in current mirror circuit 180.

As a consequence, the output current Attx*Itel_in flowing out of the current output node 136 at (CANC−) port 501 is equal and in the opposite direction to the current Attx*Itel_in flowing from (CANC+) port 502 into current output node 135, so that both phases of the cancellation current Attx*Itel_in are available at ports 501 and 502 for application to the programmed impedance element 65, for signal cancellation as described above.

It should be noted that availability of both phases of the cancellation current at ports 501 and 502 is significant, as the optimum node for cancellation may exhibit either phase, depending on the SLIC architecture. As described above, the ability of the teletax signal cancellation stage 20 to provide a current attenuation factor of Attx is also desirable, in order to minimize the injection of addition noise into the transmission and receiver channels of the SLIC stage 10.

Since the input stage 110 of the transconductance amplifier of teletax cancellation stage 20 is connected as a ground-potential follower, the teletax signal current Itel_in flowing through the resistors 91 and 93 of the delay circuit 90 results in a modified current as set forth in equation (13) below.

$$Itel\_in=(Vtel\_in/Rttx)*1/(1+j\omega_{ttx}R_{ttx}C_{ttx}/2), \quad (13)$$

where $\omega_{ttx}$ is the frequency (in radians/sec) of the teletax signal.

Equation (13) may be rewritten as equation (14):

$$Itel\_in=(Vtel\_in/Rttx)*(1+\omega^2_{ttx}*(Rttx^2/4)*Cttx^2)^{1/2}|-\tan^{-1}\omega_{ttx}(Rttx/2)Cttx \quad (14)$$

As described above, the input/output node 123 of the transconductance amplifier of the pulse metering signal cancellation stage 20 is coupled to the output of delay stage 90, so as to receive the teletax input current Itel_in, which can be expressed in terms of the current components Ia and Ib for node 123 as:

$$Itel\_in=Ia-Ib \quad ,(15)$$

so that, $$Attx*Itel\_in=Attx*(Ia-Ib) \quad (16).$$

Combining equations (7) and (14) produces equation 17) as:

$$Attx*(Vtel\_in/Rttx)*(1+\omega^2_{ttx}*(Rttx^2/4)*Cttx^2)^{-1/2}|-\tan^{-1}\omega_{ttx}(Rttx/2)Cttx=(AI*Atel*Vtel\_in/|Zx|)|-\theta x, \text{ where } \theta x=\tan^{-1}\omega_{ttx}(Rttx/2)Cttx \quad (18)$$

and $$(Attx/Rttx)*(1+\omega_{ttx}^2*Rttx^2/4*Cttx^2)^{-1/2}=AI*Atel/|Zx| \quad (19)$$

In general, $\omega_{ttx}^2*Rttx^2/4*Cttx^2 \ll 1$, so that, from equation (19), Rttx may be approximated as:

$$Rttx=Attx|Zx|/AI*Atel \quad (20).$$

From equation (18), Cttx may be approximated as:

$$Cttx=(2/\omega_{ttx}Rttx)*\tan\Theta x \quad (21).$$

Thus, the amount of delay provided by delay stage 90 that will completely cancel the teletax signal may be achieved by a appropriate combination of the resistor values Rttx/2 and capacitor Cttx in the delay circuit 90.

As will be appreciated from the foregoing description, the unwanted and potential destructive clipping and distortion associated with the differential impedance between a SLIC and a telecommunication wireline at the elevated frequency band of pulse metering or teletax signals is effectively eliminated in accordance with the present invention, by sensing the pulse metering signals via teletax signal cancellation circuit that incorporates a transconductance amplifier circuit of the type described in the above-referenced '408 application, which generates a signal current that is fed back to a programmed impedance element in the transmission channel path of the SLIC stage so as to effectively cancel the reflected teletax signal.

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed is:

1. For use with a subscriber line interface circuit (SLIC) having tip and ring ports adapted to be coupled to a telecommunication wireline, and an auxiliary port adapted to be coupled to auxiliary signals in a frequency band different that of voice/data signals, a method of effectively compensating for distortion associated with the differential impedance between said SLIC and said telecommunication wireline at the frequency band of said auxiliary signals, said method comprising the steps of:

(a) sensing signals applied to said auxiliary port of said SLIC including said auxiliary signals;

(b) generating a signal current representative of said auxiliary signals sensed in step (a), including said auxiliary signals, and exclusive of voice/data signals; and (c) feeding only said signal current generated in step (b) to a transmission channel path of said SLIC in a manner that effectively cancels a reflected component of said auxiliary signal flowing through an impedance circuit of said transmission channel of said SLIC, wherein step (b) comprises coupling said signals sensed in step (a), including said auxiliary signals, to a transconductance amplifier circuit configured as a unity gain buffer and including an operational amplifier having a first, non-inverting input coupled to a reference voltage, and a second, inverting input to which said auxiliary signals sensed in step (a) are coupled, and an output stage coupled in a first current flow path between a first current mirror circuit coupled to a first voltage supply and a second current mirror circuit coupled to a second voltage supply, said output stage having an input terminal to which an input signal is applied, and being coupled by way of a feedback path to said second input of said operational amplifier, a first output port coupled to a second current flow path between said first and second current mirror circuits and providing a first output current having a first direction of current flow relative to said first output port, a third current mirror circuit cross-coupled between said first voltage supply and said second current mirror circuit, and a fourth current mirror circuit cross-coupled between said second voltage supply and said first current mirror circuit, a second output port coupled to a third current flow path between said third and fourth current mirror circuits and providing a second output current equal to said first output current and having a second direction of current flow relative to said second output port that is opposite to said first direction of current flow relative to said first output port, one of said first and second output currents providing said signal current representative of said auxiliary signals.

2. The method according to claim 1, wherein said output stage comprises a differentially coupled transistor circuit pair having a current flow path therethrough coupled to a first current path between said first and second current mirror circuits, and a common node coupled to said input/output port.

3. The method according to claim 1, wherein step (a) comprises sensing said auxiliary signals through a delay circuit providing a delay that is effective to completely cancel a reflected component of said auxiliary signal flowing through said impedance circuit of said transmission channel of said SLIC.

4. The method according to claim 3, wherein said delay circuit comprises a resistors—capacitor delay circuit, and wherein resistor, capacitor components of said delay circuit have values based upon the peak amplitude of the differential line voltage across said tip and ring terminals being made equal to the voice/data overload voltage.

5. The method according to claim 1, wherein said auxiliary signals comprise teletax type signals lying in t frequency band higher than that of said voice/data signals, and wherein current mirror ratios of said first, second, third and fourth current mirror circuits of said transconductance amplifier circuit are defined in accordance with a prescribed attenuation Attx, such that for teletax frequency band signals, said SLIC has a synthesized output impedance Zo of a value of zero and thereby eliminates teletax signals at the input of a codec coupled to said SLIC, so as to prevent clipping.

6. A circuit arrangement for effectively compensating for distortion associated with a differential impedance between a subscriber line circuit (SLIC), and a telecommunication wireline coupled to tip and ring ports of said SLIC, at the frequency band of auxiliary signals coupled to an auxiliary port of said SLIC, said frequency band being different that of voice/data signals coupled with said SLIC, said circuit arrangement comprising:

a sensing circuit coupled to sense signals applied to said auxiliary port of said SLIC, including said auxiliary signals; and a transconductance amplifier circuit which is coupled to said sensing circuit and is operative to generate a signal current representative only of signals sensed by said sensing circuit, including said auxiliary signals, and exclusive of voice/data signals, and wherein only said signal current is fed to a transmission channel path of said SLIC in a manner that effectively cancels a reflected component of said auxiliary signal flowing through an impedance circuit of said transmission channel of said SLIC, wherein said transconductance amplifier circuit is configured as a unity gain buffer and includes an operational amplifier having a first, non-inverting input coupled to a reference voltage, and a second, inverting input to which said auxiliary signals sensed by said sense circuit are coupled, and an output stage coupled in a first current flow path between a first current mirror circuit coupled to a first voltage supply and a second current mirror circuit coupled to a second voltage supply, said output stage having an input terminal to which an input signal is applied, and being coupled by way of a feedback path to said second input of said operational amplifier, a first output port coupled to a second current flow path between said first and second current mirror circuits and providing a first output current having a first direction of current flow relative to said first output port, a third current mirror circuit cross-coupled between said first voltage supply and said second current mirror circuit, and a fourth current mirror circuit cross-coupled between second voltage supply and said first current mirror circuit, a second output port coupled to a third current flow path between said third and fourth current mirror circuits and providing a second output current equal to said first output current and having a second direction of current flow relative to said second output port that is opposite to said first direction of current flow relative to said first output port, one of said first and second output currents providing said signal current representative of said auxiliary signals.

7. The circuit arrangement according to claim 6, wherein said output stage of said transconductance amplifier circuit comprises a differentially coupled transistor circuit pair having a current flow path therethrough coupled to a first current path between said first and second current mirror circuits, and a common node coupled to said input/output port.

8. The circuit arrangement according to claim 6, wherein said sensing circuit includes a delay circuit providing a delay that is effective to completely cancel a reflected component of said auxiliary signal flowing through said impedance circuit of said transmission channel of said SLIC.

9. The circuit arrangement according to claim 8, wherein said delay circuit comprises a resistor—capacitor delay circuit, and wherein resistor, capacitor components of said delay circuit have values based upon the peak amplitude of the differential line voltage across said tip and ring terminals is made equal to the voice/data overload voltage.

10. The circuit arrangement according to claim 6, wherein said auxiliary signals comprise teletax type signals lying in a frequency band higher than that of said voice/data signals, and wherein current mirror ratios of said first, second, third and fourth current mirror circuits of said transconductance amplifier circuit are defined in accordance with a prescribed attenuation Attx, such that for teletax frequency band signals, said SLIC has a synthesized output impedance Zo of a value of zero and thereby eliminates teletax signals at the input of a codec coupled to said SLIC, so as to prevent clipping.

11. In a subscriber line interface circuit (SLIC) having tip and ring ports adapted to be coupled to a telecommunication wireline, and a pulse metering port adapted to be coupled to pulse metering signals lying in a frequency band higher that of voice/data signals coupled with said SLIC, the improvement comprising a circuit arrangement for effectively compensating for distortion associated with the differential impedance between said SLIC and said telecommunication wireline at the frequency band of said pulse metering signals, said circuit arrangement including a transconductance amplifier circuit, which is coupled to sense signals applied to said pulse metering port including said pulse metering signals, and to generate a signal current representative of signals sensed by said transconductance amplifier circuit, including said pulse metering signals, and exclusive of voice/data signals, and wherein only said signal current is fed to a transmission channel path of said SLIC in a manner that effectively cancels a reflected component of said pulse metering signals flowing through an impedance circuit of said transmission channel of said SLIC, wherein said transconductance amplifier circuit is configured as a unity gain buffer and includes an operational amplifier having a first, non-inverting input coupled to a reference voltage, and a second, inverting input to which said pulse metering signals sensed by said sense circuit are coupled, and an output stage coupled in a first current flow path between a first current mirror circuit coupled to a first voltage supply and a second current mirror circuit coupled to a second voltage supply, said output stage having an input terminal to which an input signal is applied, and being coupled by way of a feedback path to said second input of said operational amplifier, a first output port coupled to a second current flow path between said first and second current mirror circuits arid providing a first output current having a first direction of current flow relative to said first output port, a third current mirror circuit cross-coupled between said first voltage supply and said second current mirror circuit, and a fourth current mirror circuit cross-coupled between said second voltage supply and said first current mirror circuit, a second output port coupled to a third current flow path between said third and fourth current mirror circuits and providing a second output current equal to said first output current and having a second direction of current flaw relative to said second output port that is opposite to said first direction of current flow relative to said first output port, one of said first and second output currents providing said signal current representative of said pulse metering signals.

12. The improvement according to claim 11, wherein said output stage of said transconductance amplifier circuit comprises a differentially coupled transistor circuit pair having a current flow path therethrough coupled to a first current path between said first and second current mirror circuits, and a common node coupled to said input/output port.

13. The improvement according to claim 11, wherein said circuit arrangement includes a delay circuit coupled between said pulse metering port and said transconductance amplifier circuit and providing a delay therethrough that is effective to completely cancel a reflected component of said pulse metering signals flowing through said impedance circuit of said transmission channel of said SLIC.

14. The improvement according to claim 13, wherein said delay circuit comprises a resistor—capacitor delay circuit, and wherein resistor, capacitor components of said delay circuit have values based upon the peak amplitude of the differential line voltage across said tip and ring terminals is made equal to the voice/data overload voltage.

15. The improvement according to claim 11, wherein current mirror ratios of said first, second, third and fourth current mirror circuits of said trarsconductance amplifier circuit are defined in accordance with a prescribed attenuation Attx, such that for pulse metering frequency band signals, said SLIC has a synthesized output impedance Zo of a value of zero and thereby eliminates pulse metering signals at the input of a codec coupled to said SLIC, so as to prevent clipping.

* * * * *